United States Patent [19]

Bächtiger

[11] 4,380,766
[45] Apr. 19, 1983

[54] MULTI-CHANNEL AMPLIFIER APPARATUS

[75] Inventor: Rolf Bächtiger, Oberwill, Switzerland

[73] Assignee: Siemens-Albis AG, Zurich, Switzerland

[21] Appl. No.: 289,501

[22] Filed: Aug. 3, 1981

Related U.S. Application Data

[63] Continuation of Ser. No. 97,318, Nov. 26, 1979, abandoned.

[30] Foreign Application Priority Data

Dec. 15, 1978 [CH] Switzerland .................. 12778/78
Aug. 24, 1979 [CH] Switzerland .................. 7708/79

[51] Int. Cl.³ .......................... G01S 7/02; H03K 17/00
[52] U.S. Cl. .................................. 343/5 SW; 330/51; 330/147; 370/53; 328/154; 328/158
[58] Field of Search ............. 330/147, 51; 343/5 SW; 328/154, 158; 370/53

[56] References Cited

U.S. PATENT DOCUMENTS

| | | | |
|---|---|---|---|
| 2,719,187 | 9/1955 | Pierce | 370/112 |
| 2,870,259 | 1/1959 | Norris | 330/147 X |
| 3,332,038 | 7/1967 | Stanley et al. | 330/148 X |
| 3,631,486 | 12/1971 | Anders et al. | 343/5 SW X |
| 3,667,055 | 5/1972 | Uchida | 330/51 X |
| 3,754,192 | 8/1973 | Palfreeman | 330/147 X |
| 3,801,919 | 4/1974 | Wilkes et al. | 330/51 X |
| 4,167,737 | 9/1979 | Freedman | 343/17.2 PC |

FOREIGN PATENT DOCUMENTS 832662  4/1960  United Kingdom .

OTHER PUBLICATIONS

"Surface Wave Filters, Design, Construction, and Use" by Herbert Matthews, editor, A. Wiley-Interscience Publication, John Wiley & Sons, New York, London, Sydney, Toronto, pp. 340, 341.

Primary Examiner—Malcolm F. Hubler
Attorney, Agent, or Firm—Werner W. Kleeman

[57] ABSTRACT

A multi-channel amplifier apparatus for oscillation or pulse packets wherein there is provided an amplifier having an input connected by a number of input time-delay lines with a respective input channel, each of which is correlated to an oscillation or pulse packet. The output of the amplifier is connected by means of respective series circuits of an output time-delay line and an output switch connected thereafter with a respective output channel correlated to the corresponding oscillation packet.

7 Claims, 5 Drawing Figures

MULTI-CHANNEL AMPLIFIER APPARATUS

CROSS REFERENCE TO RELATED APPLICATION

This application is a continuation of my commonly assigned copending United States application Ser. No. 97,318, filed Nov. 26, 1979, now abandoned.

BACKGROUND OF THE INVENTION

The present invention relates to a new and improved construction of a multi-channel amplifier apparatus for oscillation or signal packets.

During the processing of oscillation or pulse packets it is sometimes necessary to have available a number of parallel channels containing as identical as possible electrical characteristics. Frequently, the spacing between two successive oscillation packets or sets is a multiple of their width. Thus, for instance, with a radar device working according to amplitude monopulse techniques there are provided amplifiers whose tolerance, as concerns amplification with respect to amplitude and phase, must be maintained within as narrow limits as possible. This is necessary because the received signals delivered by the antenna arrangement only can be correlated in a certain relationship to one another for target data determination after there has been accomplished selective amplification. The solution of this objective is rendered more difficult because the received signals have a large dynamic range.

Multi-channel amplifier devices for oscillation or pulse packets which contain a respective amplifier for each channel are not capable of satisfactorily fulfilling such objectives, or at best only with large technological expenditure in equipment and complicated systems design.

SUMMARY OF THE INVENTION

Therefore, with the foregoing in mind it is a primary object of the present invention to provide a new and improved construction of a multi-channel amplifier apparatus which is not associated with the aforementioned drawbacks and limitations discussed above.

Another and more specific object of the present invention aims at providing a new and improved construction of multi-channel amplifier apparatus affording a narrow tolerance range regarding its amplification characteristics in accordance with amplitude and phase.

A further significant object of the present invention aims at providing a new and improved construction of multi-channel amplifier apparatus which is relatively simple in design, economical to manufacture, extremely reliable in operation, and requires a minimum of maintenance and servicing.

Now in order to implement these and still further objects of the invention, which will become more readily apparent as the description proceeds, the multi-channel amplifier apparatus for oscillation packets according to the invention is manifested by the features that there is provided an amplifier having an input connected by means of a number of input time-delay lines with a respective input channel, each of which is operatively correlated with an oscillation or pulse packet. The output of the amplifier is connected by means of a respctive series circuit of an output time-delay line and a subsequently connected output switch with a respective output channel correlated to the corresponding oscillation packet.

According to a further exemplary embodiment of multi-channel amplifier apparatus for oscillation packets there are provided a number of amplifiers for processing different mutually independently adjustable receiving windows. The number of amplifiers corresponds to the number of receiving windows. There are also provided a plurality of delay lines and input channels. The inputs of the amplifiers are commonly connected by means of a respective one of the delay lines with corresponding ones of the input channels. There are also provided further delay lines, switches arranged after said further delay lines, and a plurality of output channels. The outputs of the amplifiers are commonly connected by means of a respective one of the further delay lines and a subsequently connected one of the switches with corresponding ones of the output channels.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
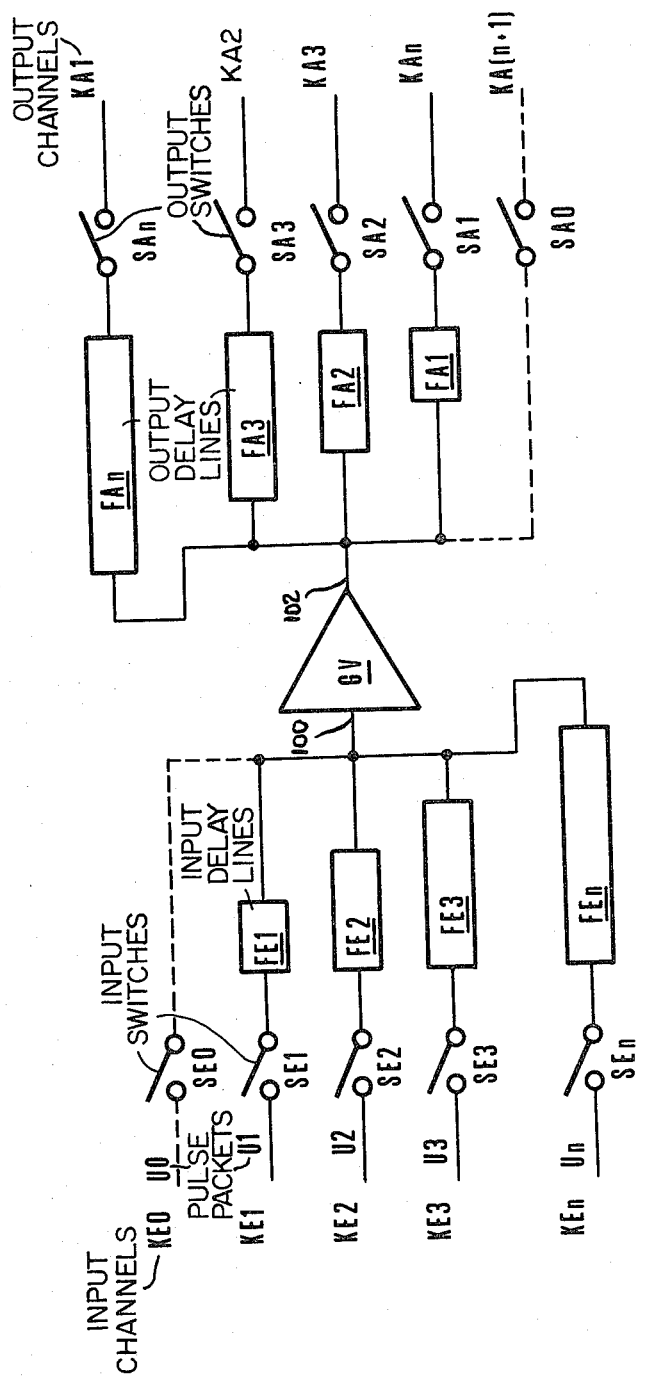
FIG. 1 is a block circuit diagram of a multi-channel amplifier apparatus according to the invention.

Describing now the drawings, the amplifier apparatus of FIG. 1 will be seen to comprise a controlled high-frequency amplifier GV, the input 100 of which is connected by a number of series circuits with a respective input channel KE1, KE2, ... KEn. Each series circuit consists of a controlled input switch SE1, SE2, ... SEn and an input delay line FE1, FE2, ... FEn. Each input channel KE1, KE2, ... KEn is correlated to a respective oscillation or pulse packet U1, U2, ... Un. The output 102 of the high-frequency amplifier GV is connected by a plurality of series circuits individually with a respective output channel KAn, Ka(n−1), ... KA2, KA1 correlated with the corresponding oscillation packet. Each such output side-series circuit comprises an output delay line FA1, FA2, ... FAn and a controlled output switch SA1, SA2, ... SAn.

The transit times Te1, Te2, ... Te(n−1), Ten of the input delay lines FE1, FE2, ... FE(n−1), FEn correspond to the transit times Tan, Ta(n−1), ... Ta2, Ta1 of the output delay lines FAn, FA(n−1), ... FA2, FA1 such that there are fulfilled the following relationships:

$$\text{Te1} + \text{Tan} = \text{Te2} + \text{Ta(n}-1) =$$

|   |                      |            |
|---|----------------------|------------|
| = | Te3 + Ta(n − 2)      | =          |
| = | ... ...              | =          |
| = | Ten + Ta1            | = constant |
|   | and Te1 <Te2 <Te3 <... <Ten |     |

The amplifier apparatus of FIG. 1 functions in the following manner. It is assumed that at the time T1 at each input switch SEi there simultaneously arrives a respective carrier frequency oscillation packet, and therefore, all of the input switches SE1, SE2, ... SEn are simultaneously closed during a brief period of time Tds. For this time duration Tdi of the i-th oscillation packet there is fulfilled the condition Tdi<Tds.

If additionally there is valid the relationship $$Te(ni+1) > (n-i+1) \cdot Tds (i=1,2, \ldots n)$$

then the oscillation packets can arrive in the time sequence U1, U2, ... Ui, ... Un, without overlapping, at the input 100 of the amplifier GV.

By virtue of the fact that now all of the input signals pass through the same high-frequency amplifier GV it is ensured that they experience the same amplification as to magnitude and phase.

Since generally the condition $Tei + Ta(n-i+1)$ is constant, the first oscillation packet U1 appearing at the output 102 of the high-frequency amplifier GV is delayed in the output delay line FAn longer than all of the others. Accordingly, the i-th oscillation packet Ui appearing at the output 102 of the high-frequency amplifier GV is delayed in the output delay line FA(n−i+1) such that it appears at the output switch SA(n−i+1) simultaneous with the oscillation packet at the output switch SAn. All of the oscillation packets thus appear at the same point in time T2 at the corresponding output switches SA1, SA2, ... SAi, ... SA(n−1), SAn which therefore are simultanously closed in order to further transmit the oscillation packets to the output channels.

With an amplifier apparatus of the type shown in FIG. 1 the input switches are not absolutely required; however they afford the advantage that there can be obtained a more favorable signal-to-noise ratio. On the other hand, absolutely necessary are the output switches, because at the output 102 of the high-frequency amplifier GV there appear in succession all of the oscillation packets, and without the provision of the output switches they could not be readily separated from one another.

There can be advantageously used as the delay lines conventional surface acoustic wave filters (SAW), such as for instance are known from "Microwave System News", September 1978, pages 75 to 84, in the article entitled "SAW-Filters Simplify Signal Sorting". These delay lines can possess bandpass filtering characteristics at frequencies between 10 MHz and 1 GHz, and therefore, without further expenditure of system components can handle the frequently required optimum filtering for improving the signal-to-noise ratio. This leads to simplification of the amplifier construction which then can be designed without any additional bandpass filter. Such surface acoustic wave filters however deliver a small spurious signal which is delayed by three transit times, caused by the unavoidable error accommodation at the output and input. Such echo signals, triple echo responses, while extremely weak can however, when greater requirements are placed upon the system, produce disturbing crosstalk at the neighboring channels and thus signal distortions. This drawback can be eliminated in a most simple fashion if there is fulfilled the echo signal condition $$Ten < .Te1.$$

If there can be discounted the advantageous bandpass filter properties of the delay lines, it is also possible, additionally in an amplifier device according to FIG. 1, to directly connect the input 100 of the high-frequency amplifier GV, if desired by means of an input switch SE0, with an input channel KE0 and the output 102 of the high-frequency amplifier GV directly by means of an output switch SA0 with an output channel KA(n+1). In such case the output channel KAi corresponds to the input channel KE(i−1) (i=1,2,n+1).

Figure 2:
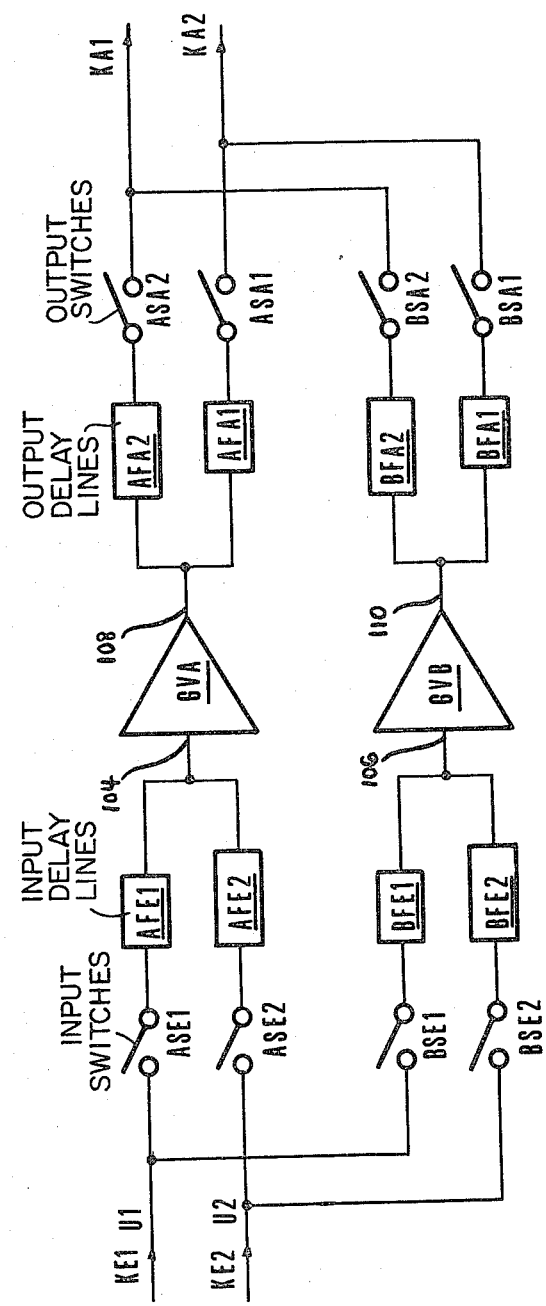
FIG. 2 is a block circuit diagram of a dual channel amplifier apparatus according to the invention containing two mutually independent adjustable receiving windows.

In radar applications it is frequently necessary to work with two so-called receiving windows, which must be adjustable independently of one another. This task can be fulfilled with the aid of two parallelly connected multi-channel amplifier devices as the same have been shown in FIG. 2 for a dual channel receiver device.

The input signal U1 is infed, on the one hand, by means of an input switch ASE1 and a delay line AFE1 to the input 104 of a first high-frequency amplifier GVA and, on the other hand, by means of an input switch BSE1 and a delay line BFE1 to the input 106 of a second high-frequency amplifier GVB. In corresponding manner the input signal U2 is infed, on the one hand, by means of an input switch ASE2 and a delay line AFE2 to the input 104 of the high-frequency amplifier GVA and, on the other hand, by means of an input switch BSE2 and a delay line BFE2 to the input 106 of the second high-frequency amplifier GVB. The output 108 of the high-frequency amplifier GVA is connected, on the one hand, by means of a delay line AFA2 and a therewith subsequently connected output switch ASA2 with the input of the output channel KA1 and, on the other hand by means of a delay line AFA1 and a therewith subsequently connected output switch ASA1 with the input of the output channel KA2. In analogous fashion the output 110 of the high-frequency amplifier GVB is connected, on the one hand, by means of a delay line BFA2 and a therewith subsequently connected output switch BSA2 with the input of the output channel KA1 and, on the other hand, by means of a delay line BFA1 and a therewith subsequently connected output switch BSA1 with the input of the output channel KA2. With such receiver device input signals which follow one another closely in time can be processed by the second, similarly constructed, parallelly connected amplifier device. Thus, for instance, the input switches ASE1 and ASE2 are simultaneously briefly closed, in order to pass a first rate of input signals. After a short time there are likewise briefly closed the input switches BSE1 and BSE2, in order to pass a second rate of input signals. The same correspondingly holds true in pairs for the output switches ASA2, ASA1 and BSA2, BSA1.

Figure 3:
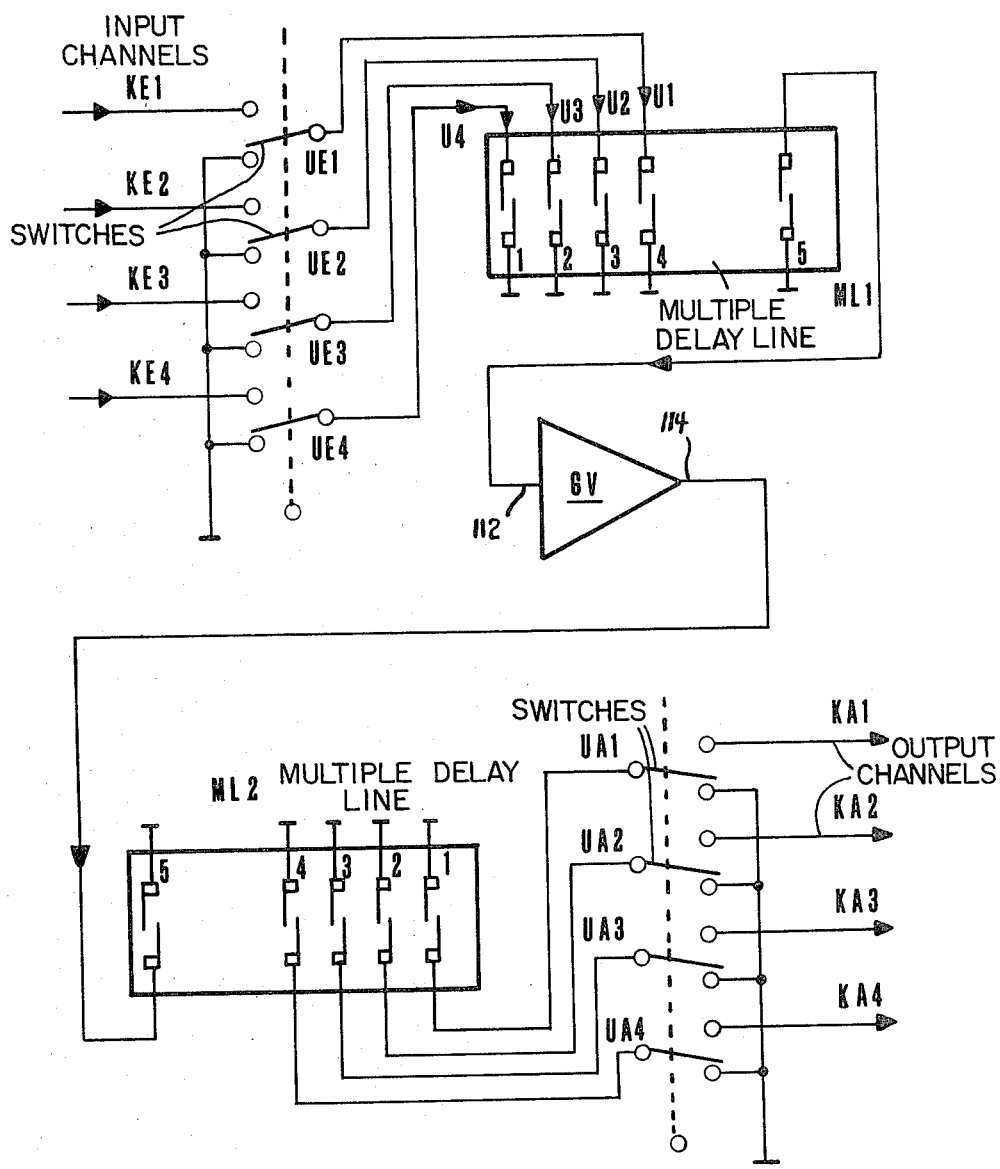
FIG. 3 is a block circuit diagram of an amplifier apparatus containing two multiple or multi-delay lines.

In FIG. 3 there is illustrated an amplifier apparatus wherein there are provided two multiple delay lines ML1 and ML2. In contrast to a single delay line each such multiple delay line ML1 and ML2 contains a number of electro-acoustical transducers, here the transducers 1, 2, 3, 4, 5. In the multiple delay line ML1 four first transducers 1, 2, 3 and 4 operate as transmitter transducers and a fifth transducer 5 as a receiver transducer.

With the multiple delay line ML2 the four first transducers 1, 2, 3 and 4 operate as receiver transducers and the fifth transducer 5 as a transmitter transducer. The amplifier apparatus shown in FIG. 3 contains an amplifier GV which at its input side 112 is connected with the receiver transducer 5 of the multiple delay line ML1 and at its output side 114 is connected with the transmitter transducer 5 of the multiple delay line ML2. Four input channels KE1, KE2, KE3 and KE4 are each connected by means of a switch UE1, UE2, UE3, UE4, respectively, with the fourth, third, second and first transmitting transducers 4, 3, 2 and 1 of the multiple delay line ML1, and four output channels KA1, KA2, KA3 and KA4 are connected by means of their respective switches UA1, UA2, UA3 and UA4 with the first, second, third and fourth receiver transducers 1, 2, 3 and 4 of the multiple delay line ML2.

The amplifier apparatus of FIG. 3 functions in the following manner: $\tau ij$ constitutes the delay time between the i-th and the j-th transducer, and there are valid the following relationship:

$$\tau 12 = \tau 21 = \tau 34 = \tau 43 = \tau p$$

$$\tau 23 = \tau 32 = \tau q$$

and $$\tau 45 = \tau 54 = \tau o$$

wherein: there can be valid $\tau o \neq \tau k = \tau q$.

An oscillation packet U1 arriving by means of the channel KE1 reaches, by means of the switch UE1, the fourth transmitter transducer 4 and requires a time $\tau 45 = \tau o$ until it arrives at the receiver transducer 5 of the multiple delay line ML1. After the amplification of such oscillation packet in the amplifier GV it arrives at the transmitter transducer 5 of the multiple delay line ML2 where it remains for a time $\tau 54 + \tau 41 = \tau o + 2 \cdot \tau p + \tau q$, until it arrives at the first receiver transducer 1 from where it reaches, by means of the switch UA1, the channel output KA1. Therefore, the oscillation packet U1 remains throughout a total time $\tau t = 2 \cdot \tau o + 2 \cdot \tau p + \tau q$ in the amplifier apparatus. An oscillation packet U2 delivered by the channel KE2 remains during a time $\tau 34 + \tau 45 = \tau p + \tau o$ in the multiple delay line ML1 and during a time $\tau 54 + \tau 42 = \tau o + \tau p + \tau q$ in the multiple delay line ML2. The total delay time is therefore $\tau t = 2 \cdot \tau o + 2 \cdot \tau p + \tau q$. The same total delay time also is applicable to the oscillation packets U3 and U4.

With the realization of an amplifier apparatus containing multiple delay lines according to FIG. 3 there are attained appreciable savings in relation to an amplifier apparatus with individual delay lines, since their inputs and outputs cannot be simply parallelly connected if high-frequency signals should be coupled. To combine the individual delay lines there are thus required special summation or distribution networks, which are not present with an amplifier apparatus containing multiple delay lines. Since additionally these can be identical there is realized a further advantage that it is possible to get by with a single photolithographic mask. A multiple delay line furthermore affords the advantage that it requires less space than the sum of a corresponding number of individual delay lines, and that all of the delay paths are thermally coupled.

Figure 4:
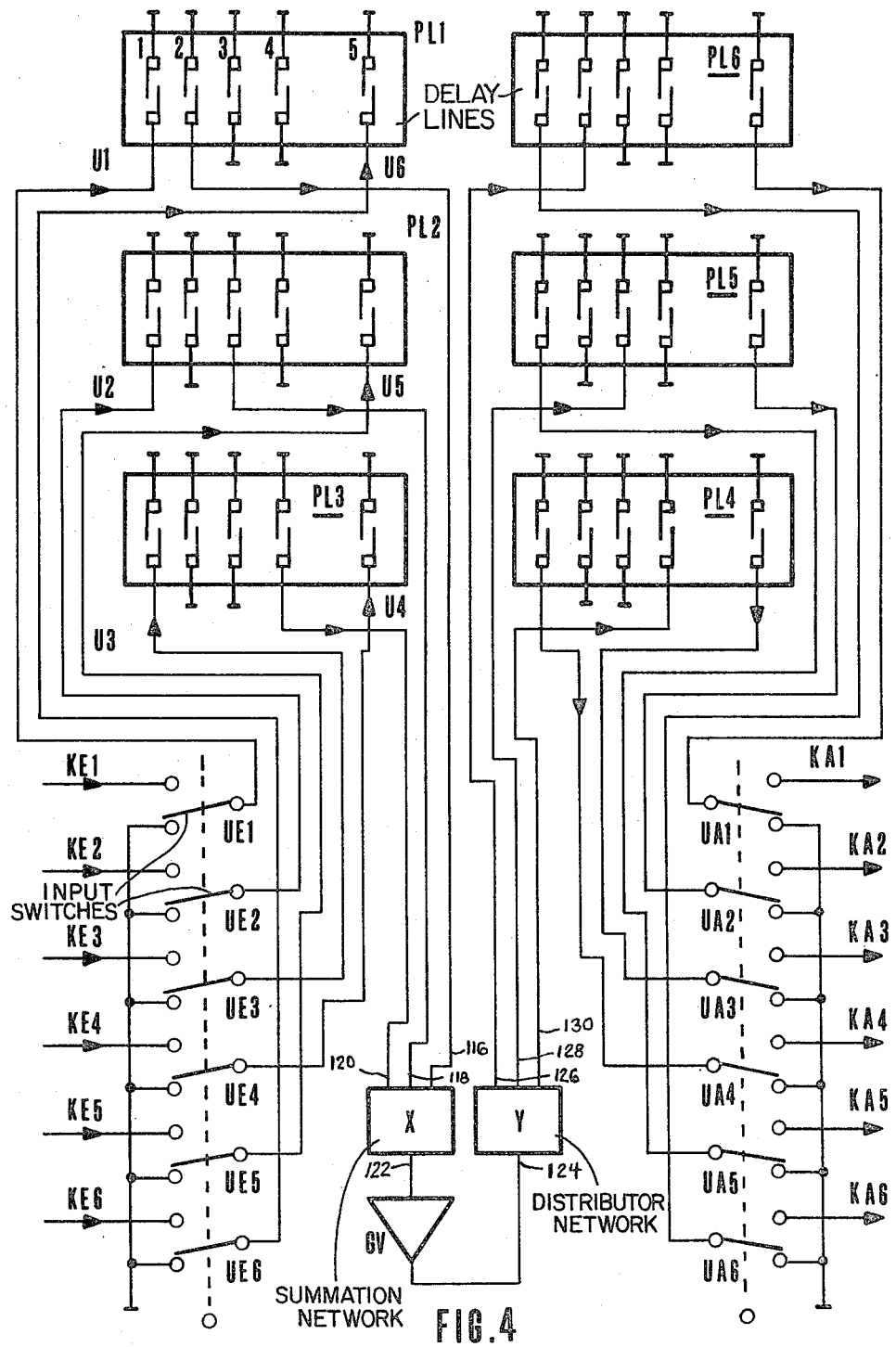
FIG. 4 is a block circuit diagram of an amplifier apparatus containing bidirectional multiple or multi-delay lines.

The amplifier apparatus illustrated in FIG. 4 utilizes the bidirectional properties of the acoustical transducer at the crystal substrate. This amplifier apparatus contains six multiple delay lines PL1, PL2, PL3, PL4, PL5 and PL6, which are constructed like the multiple delay lines ML1 and ML2 (FIG. 3). By means of a respective input switch UE1, ... UE6 the channel input KE1, KE2 and KE3 can be connected with a respective first transducer and the channel inputs KE6, KE5 and KE4 can be connected with a respective last transducer of the delay lines PL1, PL2 and PL3, respectively. The second transducer of the delay line PL1, the third transducer of the delay line PL2 and the fourth transducer of the delay line PL3 are each connected with a respective input 116, 118 and 120 of a summation network X, the output 122 of which is connected by means of an amplifier GV with the input 124 of a distributor network Y. The second transducer of the delay line PL6, the third transducer of the delay line PL5 and the fourth transducer of the delay line PL4 are each connected with an output 126, 128, 130 of the distributor network Y. By means of a respective switch UA1, UA2 and UA3 the channel outputs KA1, KA2 and KA3 are connectible with a respective last transducer and by means of the respective switches UA6, UA5 and UA4 the channel outputs KA6, KA5 and KA4 are connectible with a respective first transducer of the delay lines PL6, PL5 and PL4, respectively.

There can be employed as the summation network X and as the distributor network Y a respective so-called branch point. Such type branch points, also referred to as power divider, are for instance known from the reference book, "Taschenbuch der Hochfrequenztechnik" of H. Meinke and F. M. Gundlach, Springer Verlag 1968, page 361, and therefore need not here to further described.

If an intermediate electro-acoustical transducer excites one of the delay lines PL6, PL5 or PL4, then in both radiation directions there propagate exactly equally intensive mechanical waves. This is a contrast to the normal situation wherein one of both waves is suppressed. Such suppression normally occurs by means of an inelastic damping mass which is mounted upon the substrate, or there are selected special transducer structures which, for instance, suppress the one radiation direction by opposite phase excitation.

The delay lines PL1, PL2 and PL3 are operated in opposed fashion in that, signals are fed into the first and last transducer and summated in the intermediate transducer.

The multi-channel amplifier apparatus of FIG. 4 functions in the following manner: $\tau ij$ constitutes the delay time between the i-th and the j-th transducer, and by virtue of the geometry there are valid the relationships $\tau 12 + \tau 23 = \tau 13 = \tau 32 + \tau 21 = \tau 31$ and generally $\tau ik + \tau kj = \tau ij$ for $i < k < j$. Also in this case there can be valid $\tau 12 \neq \tau 23 \neq \tau 34$.

An oscillation packet U1 travels from the first to the second transducer in the delay line PL1, through the amplifier GV and then from the second to the last transducer in the delay line PL6; thus there is realized a total delay time of $\tau t = \tau 12 + \tau 25 = \tau 15$. The same is correspondingly true for the total delay time of the oscillation packets U2 and U3, which likewise is $\tau 15$.

An oscillation packet U4 arrives at the delay line PL3, from the latter at the fourth transducer and thereafter passes through the amplifier GV and then into the delay line PL4 from the fourth to the first transducer. Consequently, there is produced a total delay time of $\tau t = \tau 54 + \tau 41 = \tau 51 = \tau 15$.

The same holds true for the total delay time of the oscillation packets U5 and U6. Simultaneously arriving oscillation packets therefore also arrive simultaneously at the switches of the output channels.

The advantage of an amplifier apparatus of the type shown in FIG. 4, wherein the condition $$\tau 12 = \tau 23 = \tau 24 = \ldots$$

need not be fulfilled, resides in the fact that inaccuracies in fabrication, for instance during fabrication of the masks, do not have any effect. Morever a reduction in costs is realized in that it is possible to get by with a single delay line structure. The individual delay elements are formed by simply short-circuiting the relevant unused transducer. With an amplifier apparatus having only two channels there additionally are not required the networks X and Y (FIG. 4).

The switches of the amplifier apparatuses of FIGS. 3 and 4 ensure that the electro-acoustical transducers are always short-circuited when there is not present an interesting signal. In this way there is ensured that those waves which pass in such arrangement through one or a number of transducers do not experience any damping by the same. In the amplifier equipment of FIGS. 3 and 4 the multiple switches also could be replaced by simple, non-grounded multiple switches.

Figure 5:
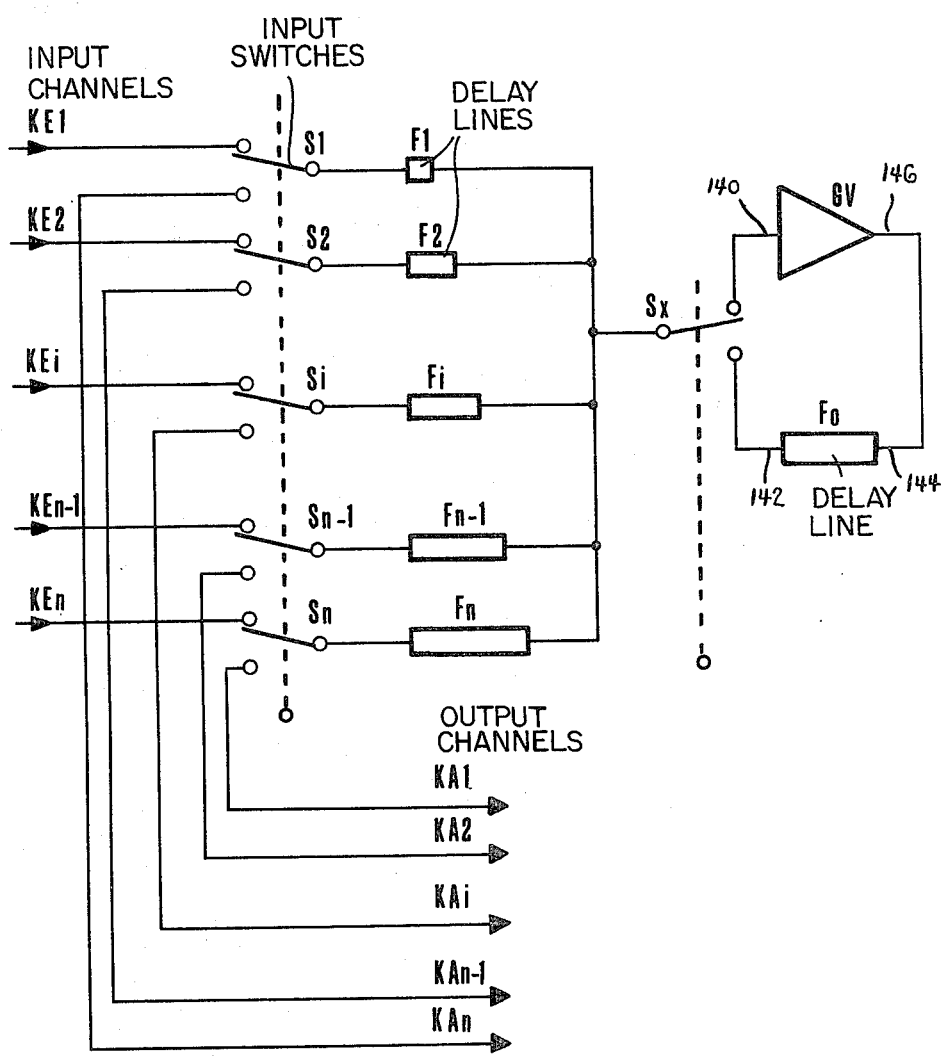
FIG. 5 is a block circuit diagram of an amplifier apparatus with double utilization of the delay line structure.

The amplifier apparatus of FIG. 5 possesses n-delay lines F1, F2, ... Fi, ... Fn−1 and Fn, each having a delay time $\tau 1, \tau 2, \ldots \tau i, \ldots \tau n-1, \tau n$. The input of each delay line Fi is connectible by means of a switch Si with an input channel KEi or with an output channel KA(n−i+1). The outputs of all of the delay lines F1, ... Fn are commonly connectible by means of a further switch Sx with the input 140 of an amplifier GV or with the output 142 of a delay line Fo, which is connected at its input side 144 with the output 146 of the amplifier GV and has a delay time $\tau o$.

An oscillation packet U1 arriving by means of the channel KE1 arrives via the switch S1, the delay line F1, the switch Sx, the amplifier GV, the delay line Fo and, after a time $\tau o$, by means of the switch Sx, the delay line Fn and the switch Sn at the channel output KA1. Hence, there is realized a total delay time $\tau 1 + \tau o + \tau n = \tau t$. An oscillation packet Ui arriving via the channel input KE1 arrives at the same time by means of the delay line Fi, Fo, and F(n−i+1) provided there has been satisfied the conditions:

$$\tau i + \tau(n-i+1) = \text{constant} \quad (i=1, \ldots n)$$

wherein, it is irrelevant whether n is an even or uneven integer.

The switches therefore must simultanously take over at the time t=0 the oscillation packets U1, ... Ui, ... Un at the input channels KE1, ... KEi, ... KEn and simultaneously at the time t=$\tau t$ outfeed the amplified oscillation packets at the channel outputs KA1, ... KAi, ... KAn.

The switch Sx must be connected throughout the time t=$\tau 1$ to t=$\tau n$ with the input 140 of the amplifier GV and from the time t=$\tau 1+\tau o$ with the output 142 of the delay line Fo. There is here valid the condition $$\tau n < \tau 1 + \tau o$$

The delay lines F1, ... Fn of the amplifier apparatus of FIG. 5 can form a multiple delay line at a single crystal substrate, and therefore can be constructed similarly for instance to the multiple delay line ML1 (FIG. 3) wherein then there must be satisfied the conditions:

$$\tau 1 = \tau 45, \tau 2 = \tau 35, \tau 3 = \tau 25, \tau 4 = \tau 15 \text{ and}$$
$$\tau 1 + \tau 4 = \tau 2 + \tau 3.$$

In this case there is obtained the advantage that changes in the delay times due to temperature drift do not have any disturbing effect.

The electro-acoustical transducers according to FIGS. 3, 4 and 5 can be constructed in such a manner that they possess a certain filtering characteristic, for instance a bandpass characteristic.

The amplifier apparatuses illustrated for instance in FIGS. 3 and 4 for four or six channels, respectively, of course can also be expanded upon in the same manner for a larger number of channels.

In order to realize the delay lines there is preferably resorted to the use of surface acoustic wave technology. A single delay line consists of a piezoelectric crystal substrate and two electro-acoustical transducers, one of which serves as a transmitter transducer and the other as receiver transducer. Further details concerning surface acoustic wave technology can be found for instance in the article entitled "Bauelemente mit akustischen Oberflächenwellen", appearing in the German publication "Nachrichtenelektronik", volume 6, 1978, pages 181 to 187.

While there are shown and described present preferred embodiments of the invention, it is to be distinctly understood that the invention is not limited thereto, but may be otherwise variously embodied and practiced within the scope of the following claims. Accordingly,

What is claimed is:

1. A multi-channel amplifier apparatus for oscillation packets, comprising:

an amplifier having an input and an output;
input and output delay line means;
input switches and output switches;
the input delay line means being formed by at least one primary electro-acoustical multiple delay line having a receiver transducer and a plurality of transmitter transducers;
said transducers being contained on a crystal substrate;
said amplifier further being connected at its input with the receiver transducer of the primary multiple delay line;
a plurality of input channels connected with a respective transmitter transducer of the primary multiple delay line;
each of said input channels being capable of being connected via a related input switch with correlated outputs of a radar front-end simultaneously delivering sporadic oscillation packets to be transmitted over the multi-channel amplifier apparatus;
said input switches insuring that said electro-acoustical transmitter transducers are always collectively short-circuited with a reference potential or earth when the oscillation packets are not present;
the output delay line means being formed by at least one secondary electro-acoustical multiple delay line having a transmitter transducer and a plurality of receiver transducers;
said transducers being contained on a crystal substrate;

said amplifier further being connected at its output with the transmitter transducer of the secondary multiple delay line;

a plurality of output channels connected with a respective receiver transducer of the secondary multiple delay line;

each of said output channels being capable of being connected via a related output switch with correlated inputs of a signal processor receiving the sporadic oscillation packets simultaneously transmitted over the multi-channel amplifier apparatus; and said output switches insuring that said electro-acoustical receiver transducers are collectively always short-circuited with a reference potential or earth when the oscillation packets are not present.

2. The amplifier apparatus as defined in claim 1, wherein:

the delay line means with the largest delay time possesses a delay which is less than three times the magnitude of the delay line means having the shortest delay time in order to avoid spurious effects caused by echo signals.

3. The amplifier apparatus as defined in claim 1, wherein:

said delay line means constitute delay lines which possess bandpass filter characteristics in order to improve the signal-to-noise ratio of the amplifier apparatus.

4. The amplifier apparatus as defined in claim 1, further including:

at least one secondary electro-acoustical multiple delay line containing first and last transducers functioning as receiver transducers and an intermediate transducer functioning as transmitter transducer.

5. The amplifier apparatus as defined in claim 4, further including:

a distributor network arranged in circuit with the output of said amplifier for delivering input signals to the intermediate transmitter transducer of said at least one secondary multiple delay line.

6. The amplifier apparatus as defined in claim 1, further including:

at least one primary electro-acoustical multiple delay line containing first and last transducers functioning as transmitter transducers and an intermediate transducer functioning as receiver transducer.

7. The amplifier apparatus as defined in claim 6, further including:

a summation network arranged in circuit with the input of said amplifier for receiving output signals delivered by the intermediate receiver transducer of said at least one primary multiple delay line.

* * * * *